US006796866B2

(12) United States Patent
George et al.

(10) Patent No.: US 6,796,866 B2
(45) Date of Patent: Sep. 28, 2004

(54) SILICON MICROMACHINED BROAD BAND LIGHT SOURCE

(75) Inventors: Thomas George, La Crescenta, CA (US); Eric Jones, Los Angeles, CA (US); Margaret L. Tuma, Strongsville, OH (US); Michael Eastwood, South Pasadena, CA (US); Richard Hansler, Pepper Pike, OH (US)

(73) Assignee: California Institute of Technology, Pasadena, CA (US)

( * ) Notice: Subject to any disclaimer, the term of this patent is extended or adjusted under 35 U.S.C. 154(b) by 14 days.

(21) Appl. No.: 10/273,676

(22) Filed: Oct. 18, 2002

(65) Prior Publication Data

US 2003/0041649 A1 Mar. 6, 2003

Related U.S. Application Data

(62) Division of application No. 09/613,818, filed on Jul. 10, 2000, now abandoned.
(60) Provisional application No. 60/190,702, filed on Mar. 17, 2000, and provisional application No. 60/142,989, filed on Jul. 8, 1999.

(51) Int. Cl.[7] .............................. H01J 9/24; H01L 21/00
(52) U.S. Cl. .......................................... 445/23; 438/50
(58) Field of Search ........................ 445/23–25; 438/50, 438/456, 745, 52, 53

(56) References Cited

U.S. PATENT DOCUMENTS

| | | | | |
|---|---|---|---|---|
| 3,604,971 A | * | 9/1971 | Tracy | 313/522 |
| 3,846,661 A | * | 11/1974 | Brown et al. | 313/491 |
| 4,243,910 A | * | 1/1981 | Nagai | 313/522 |
| 4,864,186 A | | 9/1989 | Milewski et al. | 313/341 |
| 5,285,131 A | | 2/1994 | Muller et al. | 313/578 |
| 5,369,481 A | * | 11/1994 | Berg et al. | 250/228 |
| 5,500,569 A | | 3/1996 | Blomberg et al. | 313/578 |
| 5,508,587 A | * | 4/1996 | Williams et al. | 313/113 |
| 5,814,840 A | | 9/1998 | Woodall et al. | 257/103 |
| 5,827,438 A | | 10/1998 | Blomberg et al. | 219/544 |
| 5,844,364 A | | 12/1998 | Beardmore | 313/522 |
| 5,946,083 A | * | 8/1999 | Melendez et al. | 356/317 |
| 5,955,839 A | | 9/1999 | Jaffe et al. | 313/578 |
| 5,956,003 A | | 9/1999 | Fisher | 345/73 |
| 6,100,107 A | * | 8/2000 | Lei et al. | 438/456 |

* cited by examiner

Primary Examiner—Joseph Williams
(74) Attorney, Agent, or Firm—Fish & Richardson P.C.

(57) ABSTRACT

A micro electromechanical system (MEMS) broad band incandescent light source includes three layers: a top transmission window layer; a middle filament mount layer; and a bottom reflector layer. A tungsten filament with a spiral geometry is positioned over a hole in the middle layer. A portion of the broad band light from the heated filament is reflective off the bottom layer. Light from the filament and the reflected light of the filament are transmitted through the transmission window. The light source may operate at temperatures of 2500 K or above. The light source may be incorporated into an on board calibrator (OBC) for a spectrometer.

6 Claims, 6 Drawing Sheets

SILICON MICROMACHINED BROAD BAND LIGHT SOURCE

CROSS-REFERENCE TO RELATED APPLICATIONS

This application is a divisional of U.S. application Ser. No. 09/613,818, filed Jul. 10, 2000, (abandoned) which claims priority to U.S. provisional applications serial No. 60/142,989, filed Jul. 8, 1999, and serial No. 60/190,702, filed Mar. 17, 2000.

ORIGIN OF INVENTION

The invention described herein was made in the performance of work under a NASA contract, and is subject to the provisions of Public Law 96-517 (35 U.S.C. 202) in which the Contractor has elected to retain title.

BACKGROUND

On board calibrators (OBCs) are used to improve the performance of spectrometers used for terrestrial observation as well as planetary exploration missions. OBCs enable acquisition of quantitative and accurate spectral data. Although such OBCs are desirable components, they may be used only when the missions are large enough to accommodate the relatively large size, mass and power requirements of conventional OBCs.

OBCs utilize a stabilized broad band light source. Broad band light sources fabricated from off-the-shelf light bulb technology and discrete electronics are relatively large, have high power requirements and long start-up stabilizing times, and give off a considerable amount of heat.

Accordingly, it is desirable to provide a low mass, low power, monolithic broad band light source in a rugged package that may be integrated with electronics and optical fibers for use in an OBC.

SUMMARY

An incandescent light source according to an embodiment includes a top layer having a transmission window attached to a filament mount including a cavity. A spiral filament is connected to the filament mount and extends across the cavity. The filament is positioned under the transmission window.

The filament may be tungsten and operate at a temperature of at least about 2500 K. The filament may be at least 10 $\mu$m thick, with a fill factor between about 33% and 90%.

A bottom reflector layer may be attached to the other side of the filament mount with a reflective metal layer facing the filament.

The transmission window may be transparent to wavelengths between about 500 nm and 900 nm. The transmission window may include, for example, silicon nitride or pyrex.

The light source may operate at an input power of less than or equal to about 2 W.

The light source may be integrated into an on board calibrator (OBC) to be used in a spectrometer.

The top layer may be fabricated by depositing a 1000 Å layer of silicon nitride on either side of a silicon substrate and forming a transmission window by etching a cavity through the bottom silicon nitride layer and bulk silicon. According to an alternate embodiment, the transmission window may be a pyrex plate.

The middle layer may be fabricated by depositing a 1000 Å layer of silicon nitride on both sides of a silicon substrate and etching a hole through the middle layer. Leads may be deposited on either side of the hole and the filament ends attached to the leads, such that the filament extends across the hole. The leads may extend beyond the end of the top layer where wire bonded leads provide electrical connection to the device.

The bottom layer may be formed by depositing a reflective metal film on a silicon substrate. The three layers may be stacked and oriented such that the transmission window is positioned over the filament and the reflective metal film faces the filament. The three layers may then be bonded together.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
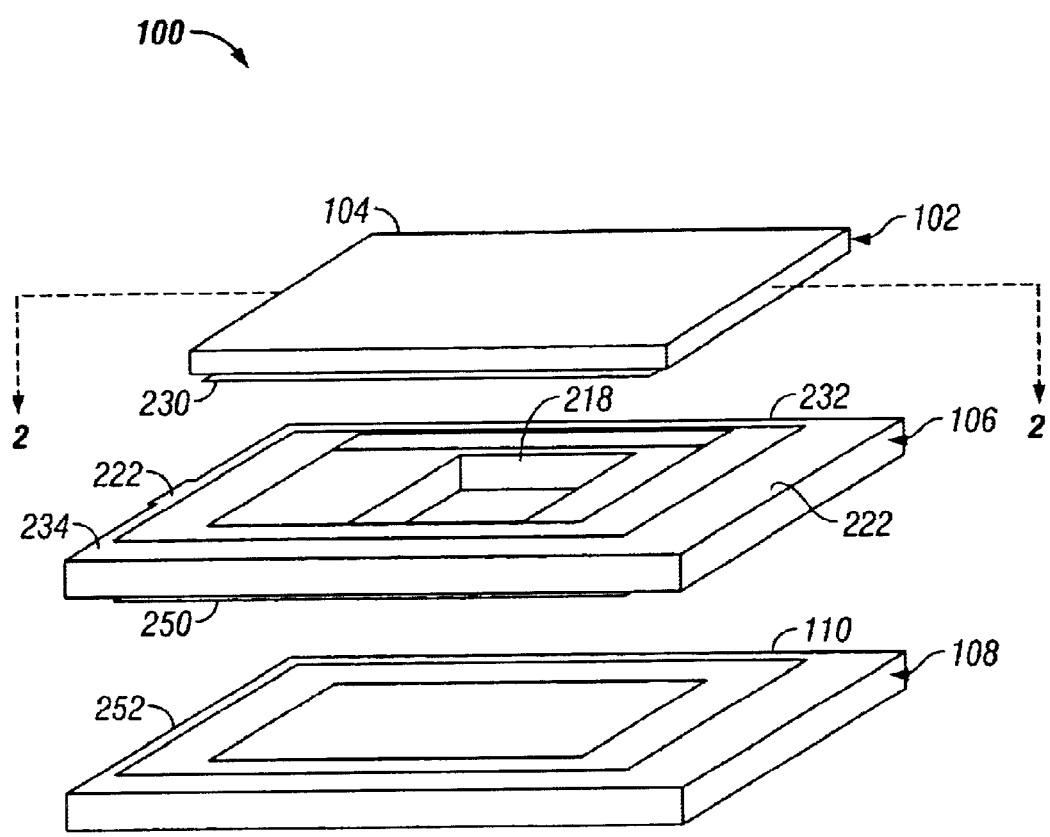
FIG. 1 is an exploded perspective view of an incandescent light source according to an embodiment.
Figure 2:
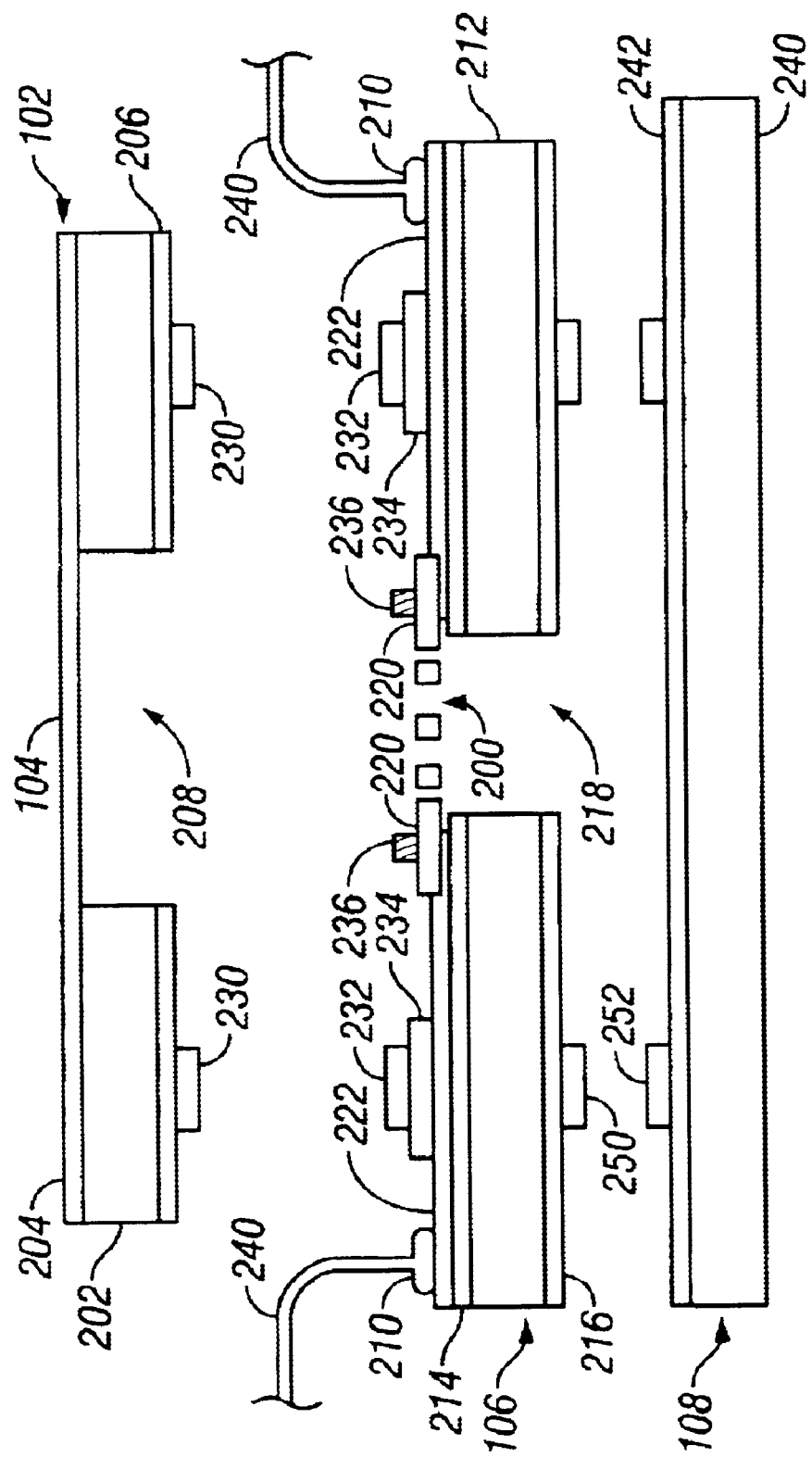
FIG. 2 is an exploded cross-sectional view of the embodiment of FIG. 1 taken along line 2—2.

FIGS. 1 and 2 show exploded views of a micro electromechanical system (MEMS) broad band incandescent light source 100 according to an embodiment. The light source includes three bonded silicon layers. These layers include a top layer 102 having a transmission window 104, a middle filament mount layer 106, and a bottom layer 108 having a reflector 110. The entire structure may be about 8 mm thick.

The top layer 102 includes the transmission window 104 to transmit the light produced by a filament 200 (FIG. 2). The top layer 102 includes a silicon substrate 202 with top and bottom silicon nitride layers 204, 206. A cavity 208 is formed through the center of the substrate 202 and bottom silicon nitride layer 206. The free standing portion of the top silicon nitride layer 204 serves as the transmission window 104. The transmission window is transparent to a broad spectrum of light, including wavelengths between about 500 nm to 900 nm.

Figure 3:
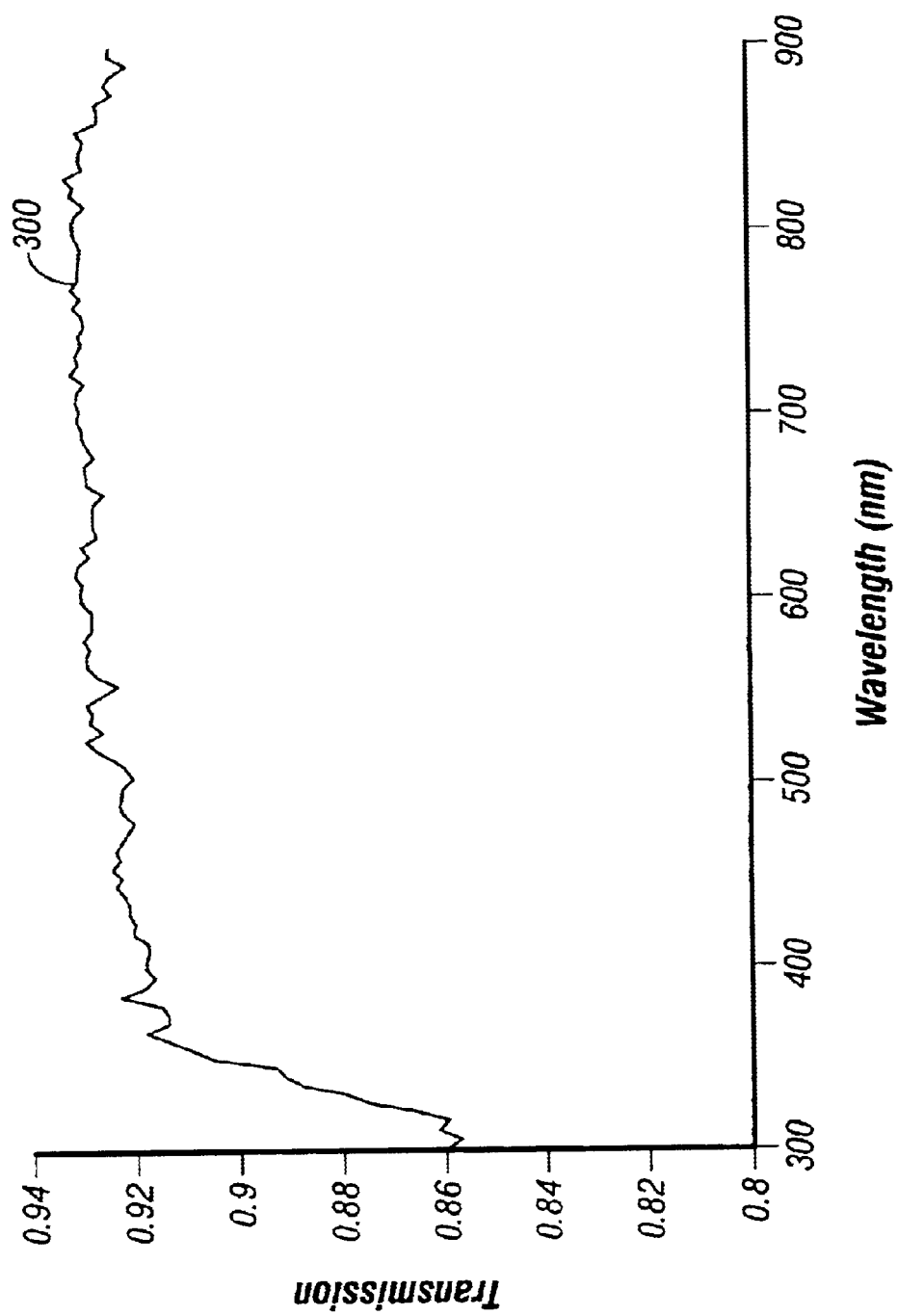
FIG. 3 is a graph showing transmission through a pyrex transmission window in a light source according to an embodiment.

According to an alternate embodiment, the transmission window 104 may be a pyrex cover slip that is bonded anodically to the silicon substrate, with no intervening silicon nitride layer. The pyrex transmission window is also transparent to light having wavelengths between about 500 nm to 900 nm. FIG. 3 illustrates a transmission response curve 300 for the pyrex coverslip according to an embodiment. The pyrex cover slip may be thicker and more mechanically robust than the nitride layer, but may require more fabrication steps and may add to the thickness of the transmission window and the overall final device.

Different materials may be used for the transmission window to transmit other portions of the wavelength spectrum, for example, the infrared (IR) portion. By changing the material of the transmission window, the output optical spectrum may be tailored to a particular need.

The middle layer 106 provides a mount for the tungsten filament, a wire bond pad 210 with a wire bond lead 240 for wire bonding to external packaging, and electrical leads 222 between the filament 200 and wire bond pads 210. The middle layer 106 includes a silicon substrate 212 with top and bottom silicon nitride layers. A hole 218 is formed through the silicon substrate and top and bottom nitride layers 214, 216. The tungsten filament 200 may have a spiral geometry, such as that shown in FIG. 4, and extends across the hole 218. The filament ends 220 are connected to wire bond pads 210 on either side of the hole by two electrical leads 236. The electrical leads 222 may Ti/Pt/Au islands which are used to electrically connect the filament to an external power supply.

A filament with a thickness of about 10 $\mu$m or greater may avoid significant losses due to evaporation, hence improving the lifetime of the filament. According to an embodiment, the spiral tungsten filament 200 may be about 25 $\mu$m thick, with each spiral having an area of about 1400 $\mu$m×1400 $\mu$m. The spiral filament shown in FIG. 4 has a fill factor of about 50%, where the fill factor is the ratio of surface area of material to the total area. The filament fill factor may be in a range of about 33% to about 90%. At a fill factor of 90%, the distance between adjacent tungsten coils is about 5 $\mu$m. The higher the fill factor, the more densely packed the filament, which may produce a more intense and uniformly distributed light source. The limiting factors for the fill factor include electrical shorting and arcing between the spirals.

The top layer 102 and middle layer 106 may be connected by corresponding Ti/Pt/Au bonding rings 230, 232. A 1 $\mu$m layer of nitride 234 may be provided to insulate the wire bond leads on the middle layer 106 from the bonding ring 232.

The bottom reflector layer 108 provides a reflective surface to improve transmission through the transmission window 104 above. The bottom reflector layer includes a silicon substrate 204 with a reflective metal layer 242. The reflective layer 242 may be a Ti/Pt 200/1000 Å reflective film. Silver may also be used as a reflective material. The bottom layer 108 may be bonded to the middle layer 106 by corresponding Ti/Pt/Au bonding rings 250, 252. The thermal compression of these pairs of Ti/Pt/Au rinds (230 and 232) and (250 and 252) may be held at a pressure of about $10^{-6}$ Torr or in an inert atmosphere at or slightly below atmospheric pressure to provide a hermetic seal.

According to an embodiment, the MEMS broad band incandescent light source 100 may be produced by fabricating the three layers and bonding them together. The top layer 106 may be fabricated by depositing a 1000 Å low stress nitride film 204, 206 onto the top and bottom surfaces of a 400 $\mu$m thick bare silicon wafer using a plasma enhanced chemical vapor deposition (PECVD) process. A Ti/Pt/Au 200/200/2000 Å bonding ring 230 may then be evaporated onto the unpolished side of the silicon wafer using a liftoff process. The bottom nitride layer 206 and the bulk silicon may be etched to reveal the top nitride window 104. The etched cavity 208 is wider than the filament length to allow the 25 $\mu$m thick filament 200 mounted to middle layer 106 to fit inside the cavity 208.

Figure 4:
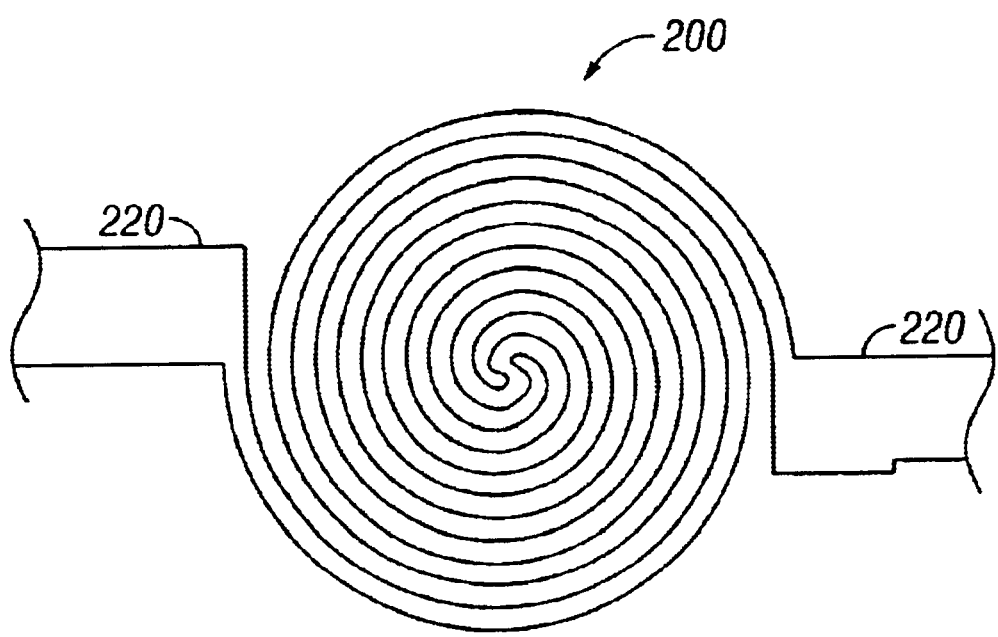
FIG. 4 is a plan view of a spiral filament according to an embodiment.

The middle layer 106 may be fabricated by depositing a 1000 Å PECVD silicon nitride layer 214, 216 on the top and bottom surfaces of a bare silicon wafer. The two Ti/Pt/Au electrical leads 222 may be evaporated in the radial direction to electrically connect the filament 200 with the wire bond pads 210 where the filament is a spiral with filament ends 220 as shown in FIG. 4. A 1 $\mu$m layer of PECVD silicon nitride 234 may be deposited on the electrical leads 222 for electrical insulation. The insulating nitride layer may be patterned in a ring and etched in a fluorine reactive ion etcher (RIE). A Ti/Pt/Au 200/200/2000 Å bonding ring 232 may be evaporated onto the nitride insulation ring using a liftoff process. The bonding ring 232 matches the bonding ring 230 on the top layer 102. A Ti/Pt/Au 200/200/2000 Å bonding ring 250 may then be deposited on the unpolished side of the wafer using a liftoff process. This bonding ring 250 functions as a bonding ring that will attach to the bonding ring 252 on the bottom reflector layer 108. Deep reactive ion etching (DRIE) may be used to etch the hole through the entire silicon wafer.

The bottom reflector layer may be fabricated by evaporating a Ti/Pt 200/1000 Å reflective film 242 onto a bare silicon wafer. As described above, silver may also be used as a reflective material. A Ti/Pt/Au 200/200/2000 Å ring 252 may then be evaporated onto the reflective layer for thermal compression bonding to the middle layer 106.

The tungsten filament 200 may be fabricated from a 25 $\mu$m thick tungsten sheet. A photoresist may be patterned with the filament geometry on both sides of the sheet, and the sheet chemically etched from both sides in a wet $K_3Fe(CN)_6$ etch to form a planar spiral filament. Etching from both sides may reduce lateral etching from 25 $\mu$m to 12.5 $\mu$m and thereby improve the final device fill factor. According to alternate embodiments, other methods such as laser etching may be employed to further improve filament fill factor.

The top, middle, and bottom layers may then be individually diced. The filament ends 220 may be attached to the electrical leads 222 on the middle substrate over the hole by two gold ribbons. The three layers are then oriented to align the bonding rings (230, 232, 250, 252), and the entire stack bonded under reduced pressure ($10^{-6}$ Torr) or in an inert atmosphere at or near atmospheric pressure in a thermal compression bonder. Eutectic bonding may also be employed for bonding the three layers.

To avoid damaging the nitride transmission window 104, it may be desirable to place a flat pyrex piece of device size above the nitride transmission window 104, and a graphite piece above the pyrex piece to protect the device against the surface roughness of the compression bonder piston.

The expected output optical power of the light source 100 may be calculated from the filament area, as shown in Equation (1).

$$\text{Area} = \Pi * r^2 \quad (1)$$

Since there are two sides to the filament 200, there is a multiplication factor of two, but because the fill factor of the present embodiment is ½, the two terms cancel. Accordingly, the radiant power should be the product of the total radiation intensity for tungsten, which is about 110 Watts/square cm at 2800 K, and the filament area, as given in Equation (2). For a spiral filament with a radius of 0.07 cm, the area would be 0.15 cm², yielding:

$$110 \text{ (Watts/cm}^2\text{)} * 0.015 \text{ (cm}^2\text{)} = 1.69 \text{ W}. \quad (2)$$

For an operating temperature of 2500 K, the total radiation intensity drops the value from 110 to 66.1. Hence, the filament should radiate 0.992 W. For a fill factor of ¼ instead of ½, the radiant power would drop to 0.496 W.

Figure 5:
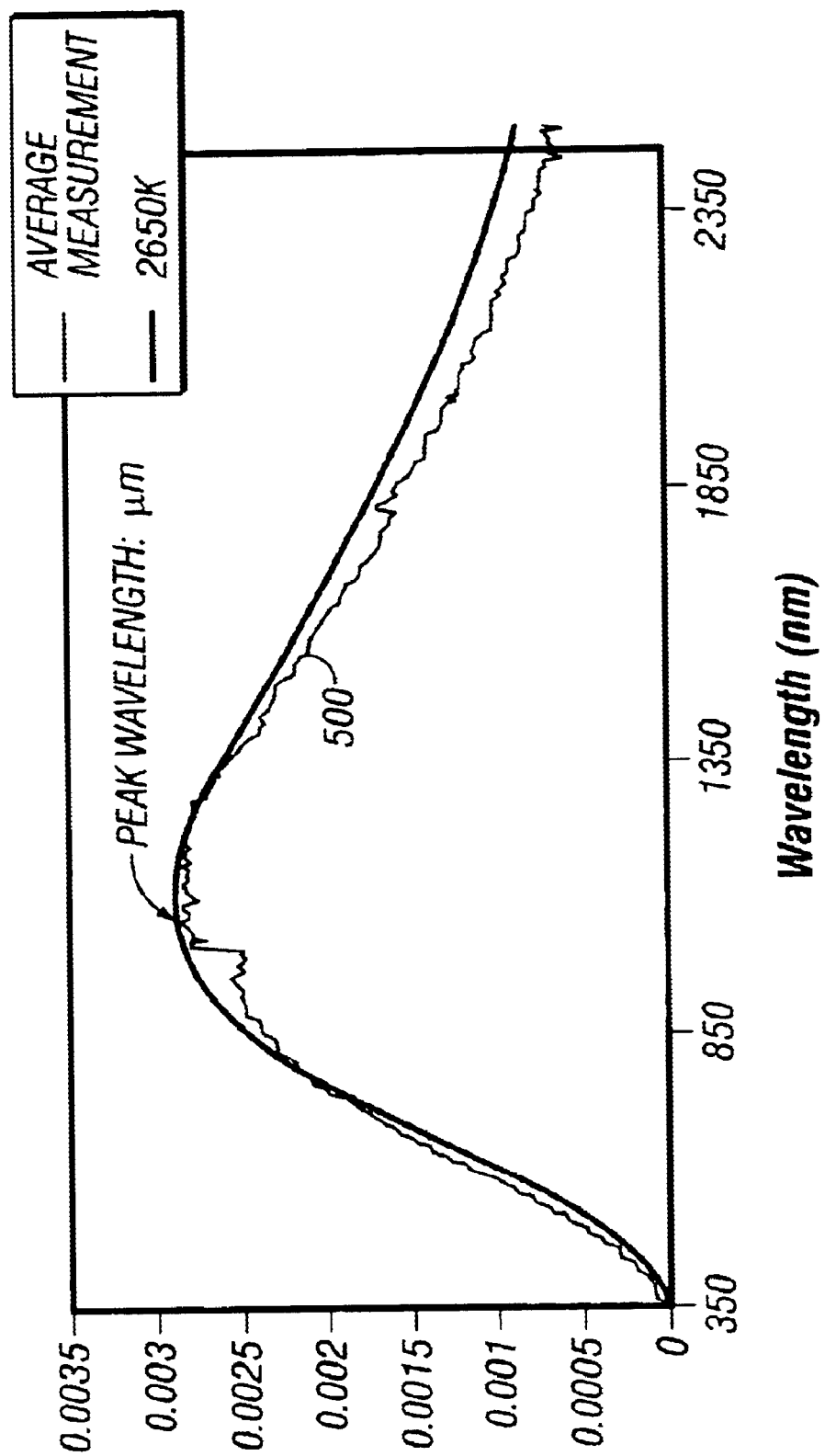
FIG. 5 is a graph showing optical output of the light source of FIGS. 1 and 2 over a broad spectrum of wavelengths.

A MEMS broad band incandescent light source 100 according to the embodiment shown in FIGS. 1 and 2 was tested. Optical output data of the light source was taken through a vacuum chamber window. Measurements were taken using an Analytical Spectral Devices (ASD) Fields Spectrometer, which can measure wavelengths of about 350 nm to 2500 nm. The spectrometer was used in conjunction with a standard 1000 W lamp and a spectralon panel that is approximately 99% reflective. A thirty-eight fiber cable (some fibers provided for visible wavelengths and some for IR) was used to transfer the light from the light source to the spectrometer with an 8-degree field-of-view. FIG. 5 shows an optical output response curve 500 of the light source. Discontinuities in the graph shown in FIG. 5 may be attributed to the changing of detectors. A blackbody approximation was fit to the experimental data, which gave a blackbody temperature of 2650 K. The light source was driven at 170 mA at 7.356 V, providing an input power of 1.25 W.

According to an embodiment, the MEMS structure may be hermetically sealed to prevent oxidation of the filament, as such oxidation may reduce the lifetime of the light source. The light source 100 may be sealed in sealing chamber which may be depressurized to form a vacuum, or filled with a chamber gas. The chamber gas may include, for example, nitrogen or halogen-doped nitrogen. A halogen-doped nitrogen environment may reduce evaporative losses by setting in motion a chemical reaction cycle that removes evaporated tungsten off of the transmission window and redeposits it on the filament 200.

According to an embodiment, the output of the device may be coupled to an optical fiber. A lens structure may be fabricated into the transmission window for coupling to an optical fiber. The lens structure may be, for example, a ball lens or a graded-index (GRIN) lens.

When a tungsten filament is heated for the first time, there is a tendency for it to distort slightly due to grain growth and forces from thermal expansion. This may cause part of the planar filament to move in or out of plane. If the filament is coupled to the fiber by the normal two-ball lens system, a small change in the position of the source may be imaged as a small change in the image position. Because the image of the filament is considerably larger than the core of the fiber, this movement may have little effect on the amount of light entering the fiber. If the structure is set before the optics are assembled, any distortion in the filament may be corrected by the placement of the optics.

Figure 6:
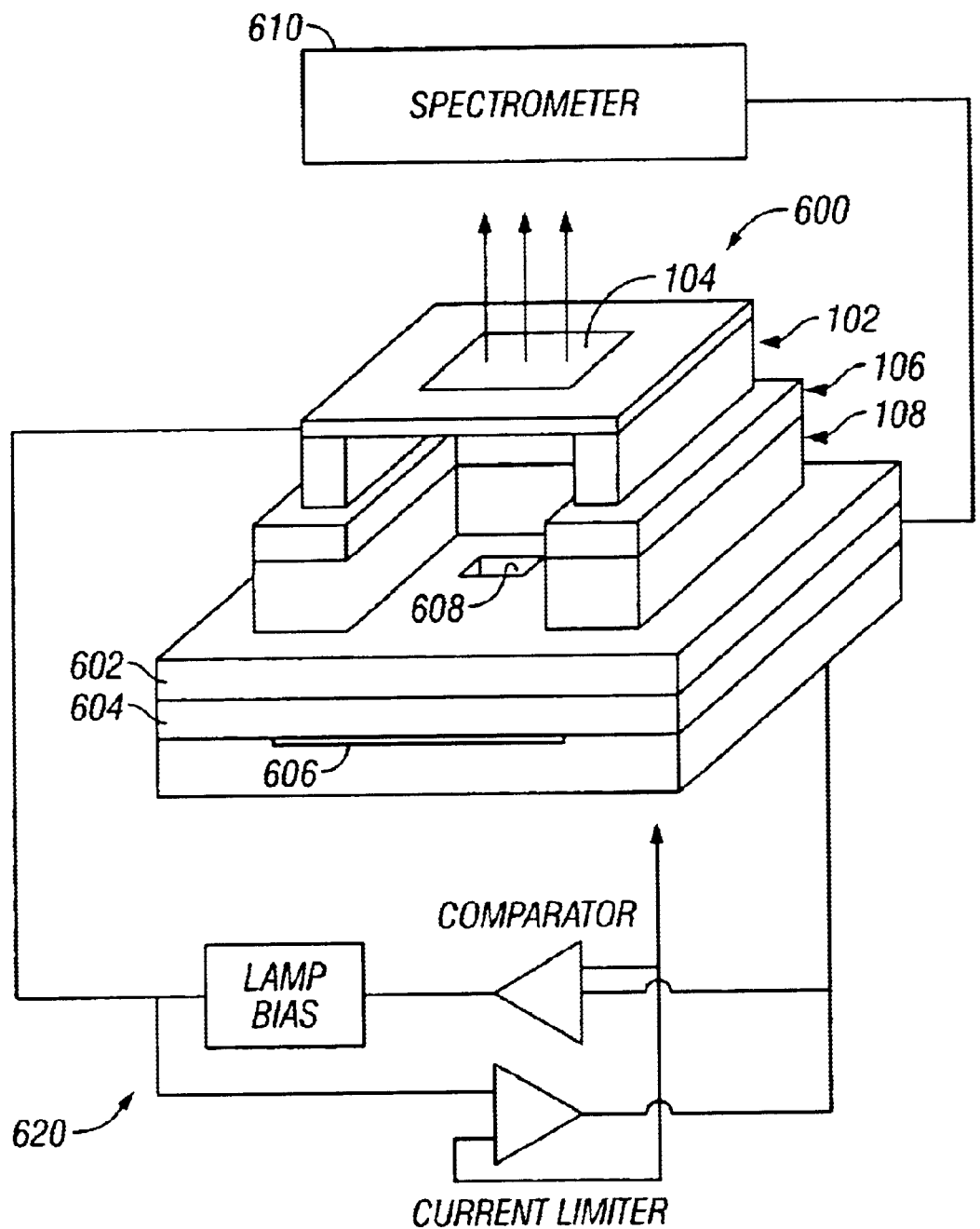
FIG. 6 is a schematic diagram of an on board calibrator (OBC) according to an embodiment.

The MEMS broad band incandescent light source 600 may be incorporated into an on board calibrator (OBC). As shown in FIG. 6, the MEMS light source 600 has a similar structure to that shown in FIGS. 1 and 2. The light source is attached to a ceramic substrate 602, a bandpass filter 604, and a photodetector 606. A transmission window 608 is provided in the bottom reflector layer 108 to pass light rays from the filament 200 through the ceramic substrate 602 and band pass filter 604 to the photodetector 606. The MEMS OBC may include a feedback loop 620 that maintains the brightness of the light source at a substantially constant level.

The MEMS OBC 600 shown in FIG. 6 may have a volume of about 30 $cm^3$, mass of about 50 g, and consume about 2 W in operation. Such a MEMS OBS is advantageously smaller in size and has a smaller mass and power consumption than OBCs employing off-the-shelf light bulb technology and discrete electronics.

A MEMS broad band incandescent light source according to an embodiment may be incorporated into various sensor devices such as a spectrometer 610. For example, the light source may be incorporated into an optic temperature sensor system to detect exhaust gas temperature (EGT) of an airplane during flight.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
    depositing a layer of silicon nitride on each of two faces of a first silicon substrate;
    etching a cavity through the first silicon substrate and one of the silicon nitride layers to form a transmission window comprising silicon nitride;
    forming a hole in a second silicon substrate;
    depositing leads on either side of the hole;
    positioning a filament comprising tungsten and having a spiral geometry across said hole;
    connecting each of two ends of the filament to an associated one of the leads;
    depositing a reflective film on one face of a third silicon substrate;
    stacking the first, second, and third silicon substrates, in that order, and orienting said substrates such that the transmission window is positioned over the filament and the reflective film faces the filament; and
    bonding the first, second, and third silicon substrates together.

2. The method of claim 1, further comprising:
    depositing a bonding ring on a face of the first silicon substrate opposite the transmission window;
    depositing a bonding ring on each of two faces of the second silicon substrate; and
    depositing a bonding ring on the reflective film of the third silicon substrate.

3. The method of claim 2, further comprising providing an insulating layer between the leads on the second silicon substrate and the bonding ring on that face of said second substrate.

4. The method of claim 1, wherein the silicon nitride layers on the first silicon substrate are about 1000 Å thick.

5. The method of claim 1, further comprising depositing a 1000 Å layer of silicon nitride on each of two faces of the second silicon substrate.

6. The method of claim 1, wherein the filament has a thickness of at least about 10 $\mu$m.

* * * * *